April 8, 1969   M. S. STRINGER   3,437,798
ELECTROMECHANICAL DEFECT COUNTER
Filed Sept. 17, 1965

INVENTOR
MYRON SCOTT STRINGER

BY Cushman, Darby & Cushman
ATTORNEYS

United States Patent Office 3,437,798
Patented Apr. 8, 1969

3,437,798
ELECTROMECHANICAL DEFECT COUNTER
Myron Scott Stringer, Florence, Ala., assignor to Burlington Industries, Inc., Greensboro, N.C., a corporation of Delaware
Filed Sept. 17, 1965, Ser. No. 488,168
Int. Cl. G06f 7/38; G06g 7/02
U.S. Cl. 235—92                                       14 Claims

ABSTRACT OF THE DISCLOSURE

Apparatus for counting the number of service operations that a machine operator performs for preventing fraudulent attempts on the part of the operator to register a false number of counts of the service operations performed by the operator wherein two time delay relays are actuated by a cam arrangement and in conjunction with a counter-actuating capacitor enable the counter to record only legitimate service operations. One of these relays permits energization of the counter only after a predetermined time interval has elapsed from the initiation of a repair while the other prevents a second count from being registered for a predetermined time after completion of a service operation.

---

Figure 1:
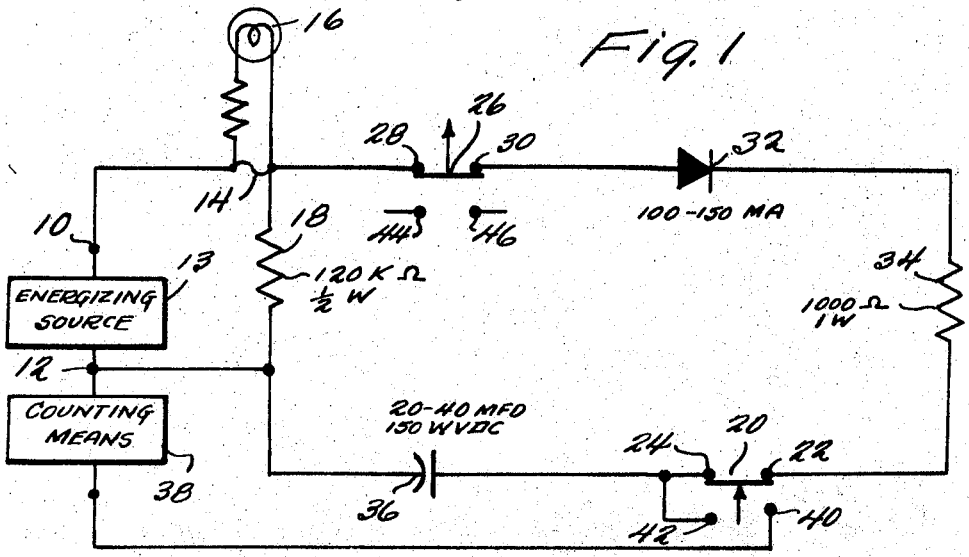

This invention is related to and generic to that described in the application of Littleton Upshur, Ser. No. 488,167, also filed Sept. 17, 1965.

The invention relates in general to apparatus for counting the number of service operations that a machine operator performs and, in particular, the invention relates to apparatus for preventing fraudulent or inadvertent attempts on the part of the operator to register a false number of counts of the service operations performed by the operator.

In the manufacture of articles where there are a large number of items to be inspected to determine whether they are perfect or whether they will need to be repaired and especially in the case where one operator inspects hundreds of items per day and repairs some, there has been in the past no adequate way to control whether the operator is given adequate time for repair, is passing articles that need repair, or is falsifying the number of articles that have been repaired.

As a typical example, in the manufacture of ladies' sheer hosiery, there are operations generally termed inspecting/pairing, repairing, and mending which consist of matching two stockings of the same identical size, inspecting these for flaws or defects, and, if necessary, repairing the defect to a quality level that will pass a predetermined standard. In the past there has been no method other than the operator's count to determine whether the operator was mending or repairing the number of stockings she reported as repaired in a normal day's working period.

Accordingly, it is an object of the invention to provide an improved apparatus for accurately counting the number of repair or service operations that a machine operator performs.

It is also an object of the invention to provide improved apparatus for preventing or discouraging attempts on the part of a machine operator to register false counts of the number of service operations performed.

Another object of this invention is to provide improved fraud prevention apparatus for establishing a first predetermined minimum time interval commencing with the initiation of a service operation during which no count of the service operation can be registered.

Another object of the invention is to provide improved fraud prevention apparatus for establishing a second predetermined time interval commencing with the completion of a service operation during which no count can be registered.

A brief description will now be given of an illustrative embodiment of the invention for carrying out the above-mentioned objects.

Assume the operator is inspecting hosiery, and she finds a defective hose. There is of necessity some type of tool or instrument, which is used to repair the hosiery. If it has been predetermined that it takes a certain length of time for the operator to remove this tool from its resting position and move it to the position for repair of the stocking, registering the count of this repair operation should be delayed on the counter until the time required for the working tool to reach the work area has elapsed. Briefly, this is accomplished by a mechanical tripping of a delayed action timer counter which will register the count only after the predetermined time interval has passed, thereby eliminating the falsification of the counter if the operator claims to have repaired more than the actual number of defective stockings.

Because varying amounts of time are necessary to repair defective stockings (since the length or degree of defects vary), a variable time element is introduced between the time when the work tool is removed from its holder and when it is replaced on the holder; therefore, the counter control mechanism is in a state of rest or dead time until the work tool used to repair defective stockings is placed within its holder. At this time the counter control is again activated and a second predetermined time is established which allows the operator to place the repaired stocking back into the production flow; therefore, no new count can be registered if the work tool is again removed from the holder before this allotted time to put the repaired goods into the work flow has passed.

Hence, it can be readily understood if an operator tries to falsify the count by removing the work tool momentarily and replacing it upon its rest area, there is no action of the count register. In addition, if the tool is subsequently removed to repair defective stocking and replaced in less time than the minimum predetermined time cycle, there is no action of the count register. The time intervals may be established by time delay relays, which are used in conjunction with a condenser for actuating the counter when a desired time interval has elapsed.

Figure 2:
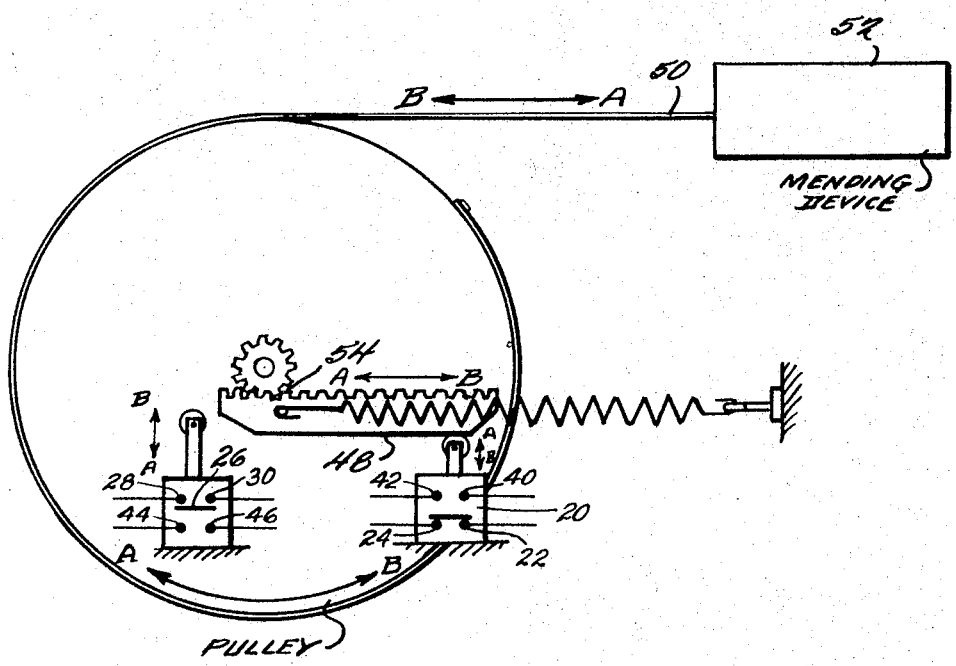

In order to more fully understood the invention, a detailed description will now be given of an illustrative embodiment where reference should be made to the accompanying drawing in which, FIGURE 1 illustrates schematically the circuitry for establishing the time intervals which must elapse before the counter can be actuated; and FIGURE 2 diagrammatically illustrates one embodiment of a counter control mechanism for controlling the circuitry illustrated in FIGURE 1.

Reference should now be made to FIGURE 1 for a full understanding of the circuitry which establishes the time intervals which must elapse before the counter can register the performance of a service operation.

It is to be understood that the circuitry described is illustrative and that the invention may be accomplished in other ways, which would occur to one skilled in this art.

The circuitry for establishing the above-mentioned predetermined time intervals is energized from the terminals 10 and 12 which are connected to 110 volt–120 volt AC commercial power. Terminal 10 may be connected to the high side of the line and terminal 12 connected to the ground side. Fuse 14 is provided to prevent overload damage from occurring. Neon lamp 16 provides an indication when fuse 14 blows. Neon lamp 16 is energized from terminal 10 through lamp 16 and the resistor 18 to ground terminal 12 when fuse 14 blows.

The plunger or contact for time delay relay or means 20 is normally depressed thereby normally connecting terminals 22 and 24. The plunger or contact for time delay relay or means 26 is normally released thereby normally connecting terminals 28 and 30. Rectifier or rectifying means 32 rectifies the AC current provided from terminals 10 and 12. Resistor 34 limits the rectifying current from rectifier 32.

Condenser or counter actuating means 36 is connected between terminals 12 and 24 and is normally disconnected from the counting means 38 (which registers the count of the service stop). Counting means 38 is connected between terminal 12 and terminal 40.

The operation of FIGURE 1 will now be described. Normally, the counter is in the rest or "not in use" position, as shown in FIGURE 1. In this position, the plunger of relay 20 is depressed by apparatus in the counter control mechanism, which will be described in more detail hereinafter. Therefore, condenser 36 is energized through fuse 14, relay 26, rectifier 32, resistor 34, and relay 20 from the energizing source 13. After condenser 36 has been energized through this path for a period in excess of several milliseconds, condenser 36 receives enough energy or stores enough charge to actuate the counting means 38 when relay 20 is caused to transfer its plunger from terminals 22, 24 to terminals 40, 42. Time delay relay 20 may be of the pneumatic type and therefore the amount of time necessary for the contact of relay 20 to transfer from terminals 22, 24 to terminals 40, 42 is determined by the value set on the pneumatic time delay relay. Upon initiation of a service operation, relay 20 is released, thereby allowing the contact or plunger of relay 20 to transfer. After the above-mentioned time interval has elapsed, condenser 36 will actuate counting means 38 by discharging its energy through terminals 24, 42 and 40 and the counting means 38 to the ground terminal 12. The time transfer set on time delay relay 20 corresponds to a first predetermined time interval which must elapse before a machine operator can be credited for a service stop.

Time delay relay 26 may also be of the pneumatic type and the amount of time for it to transfer its contacts from the depressed state to the released state is also governed by the value set on the pneumatic time relay. As mentioned before, the plunger of relay 26 is normally released and therefore an energized path is provided for condenser or actuating means 36. However, with the initiation of a service stop or operation, time delay relay 26 is caused to be depressed by the counter control mechanism which will be described in more detail hereinafter. As soon as the contact of relay 26 is depressed from the terminals 28 and 30 to the terminals 44 and 46, the energizing source 13 is removed from the condenser 36, thereby preventing further energization of condenser 36 until the contact of time delay relay 26 returns to its normal released position. The time interval necessary for the return to its normal released position is governed by the value set on the pneumatic time relay.

The contact of time delay relay 26 remains depressed while the service operation is being performed. Upon completion of the service operation or stop, the contact of time delay relay 26 is caused to be released and a second predetermined time interval is initiated which when completed allows for the energization of condenser 36 from energizing source 10.

Reference should now be made to FIGURE 2 for a brief description of the counter control mechanism which regulates the time intervals established by the circuitry of FIGURE 1. Once again, the counter is shown in a rest or "not in use" position. Components shown in both FIGURES 1 and 2 will be given the same reference numeral. In the rest position, the plunger or contact of relay 20 is shown in its normally depressed state. It is depressed by cam 48 which allows energy to be supplied to condenser 36 as described before with respect to FIGURE 1. For normal counting operations, cam 48 may stay in this position for any length of time; however, it must remain in this position for the predetermined time interval set on relay 26 (as described with respect to FIGURE 1 hereinbefore) plus the several milliseconds necessary to charge condenser 36 through rectifier 32 and resistor 34. To register a count on the counter, the following sequence occurs: Cord 50, which is attached to the mending device 52, is moved in the direction at A when a service or repair operation is initiated by the machine operator. The mending device 52 is disclosed in more detail in Patents No. 2,570,637; 2,624,183; and 2,668,428. When cord 50 moves in the direction A, a pulley and rack arrangement (schematically indicated at 54) is actuated, thereby moving cam 48 in the direction A (as shown above cam 48). The longitudinal displacement of cam 48 in the direction A allows the plunger of relay 20 to be released and when the plunger reaches its extended position, the condenser 36 is connected to the counting means 38 thereby registering the count of the service stop, as described heretofore.

In this same sequence, cam 48 depresses the contact of plunger of time delay relay 26, thereby disconnecting the energizing source 13 from the condenser 36 and preventing the condenser 36 from being reenergized until the second predetermined time interval necessary for transferring the contact of time delay relay 26 has elapsed.

While the service operation is being performed, the condenser 36 will remain disconnected from the energizing source 13 for a time period equal to the service or repair time plus the time interval set on relay 26. The condenser 36 can only be connected to the energizing source 13 when cam 48 is moved in the direction B. This occurs when the repair or mending device 52 is moved in the direction B. A ratchet plate (not shown) may also be connected to the cam 48 to regulate a ratchet assembly (also not shown) which allows the operator to work freely, with no spring pressure, once the mending device 52 has been moved to the service area.

A brief description has been given of a counter control mechanism which may be used with the invention. Many alternatives will present themselves to one skilled in this art—the features of the counter control mechanism being the capability of (1) releasing the plunger of relay 20 and depressing the plunger of relay 26 when the service operation commences, (2) allowing the operator to perform the service operation with no spring pressure, and (3) releasing the plunger of relay 26 and depressing the plunger of relay 20 when the service operation has been completed.

Thus, there has been described protection against a false or inadvertent registration of a count of a service stop by a machine operator. In order for the operator to register a count in his favor, he must remove the repair or mending device 52 from its rest position for a time not less than the first predetermined time interval set on relay 20. A second count may not be obtained until relay 26 has completed its time cycle. Time values for time delay relays 20 and 26 are completely variable and independent of each other. Each time a count is registered, a sequence is established involving the first and second predetermined time intervals described above. Each time this sequence is initiated, the timing cycles of time delay relays 20 and 26 are reestablished, regardless of how often the counting sequence is started.

With respect to the illustrated embodiment described where the operator must move a repair or mending device 52 to the area where the repair is taking place, there are further reasons why it would be undesirable for the operator to falsify counts of service stops. That is, if the operator (who is normally paid on incentive) wanted to falsify a count, the operator must at a minimum retain physical control of the mending device with one hand. While doing this, the operator cannot perform the main portion of the job, which is paid on another production basis. Therefore, this device affords maximum protection against falsification of counts of service stops.

While this device has been described with respect to the hosiery operation of repairing and mending, this description should not in any way limit the application of the device to any other application in industry. The main feature of the device is to provide means including means for preventing fraudulent or inadvertent actuation of the counting means (condenser 36) for actuating a counting means 38, where the actuating means 36 is normally energized from a source 13 of energy external to the device and where the actuating means is normally disconnected from the counting means; means (time delay relay 20) for connecting the actuating means 36 to the counting means 38 after a first predetermined time interval has elapsed from the initiation of the service or repair operation; and means (time delay relay 26) for preventing the actuating means 36 from receiving sufficient energy from the external energy source 13 to actuate the counting means 38 until a second predetermined time interval has elapsed from the completion of the service operation.

Values of the components are given in FIGURE 1 to illustrate a working embodiment of the invention. These values are given for the purpose of illustration only and there is no intent to limit the invention to the value.

While the invention has been described in its preferred embodiment, various changes may be made without departing from the spirit and scope of the invention. Therefore, the terminology used in the specification is for the purpose of description and not limitation, the scope of the invention being defined in the claims.

What is claimed is:

1. A device for preventing fraudulent or inadvertent actuation of a counter by a textile machine operator, where said counter registers the number of operations performed by said operator with a tool on the textile material being processed by said machine, said tool being movable between a normal rest position and an operation area, comprising:
    energy storage means for actuating said counter, said energy storage means being normally operatively disconnected from said counter when said tool is in its normal rest position;
    means for operatively connecting said energy storage means to said counter only when said tool is removed from its normal rest position to said operation area and after a first predetermined time interval has elapsed from the initiation of an operation, thereby actuating said counter; and
    means for preventing said energy storage means from actuating said counter until a second predetermined time interval has elapsed from the completion of said operation and the replacement of said tool in its normal at rest position.

2. A device as in claim 1 where said energy storage means is a condenser.

3. A device as in claim 2 where said second and third mentioned means are time delay relays.

4. A device as in claim 3 including an energy source for charging said condenser to a level sufficient to actuate said counter only after said second predetermined time interval has elapsed, said energizing source being disconnected from said actuating means when said operation is commenced.

5. A device as in claim 4 including means for rectifying the energy supplied by said energizing source to said energy storage means.

6. A device for preventing fraudulent or inadvertent actuation of a counter by a machine operator, where said counter registers the number of service operations performed by said operator, comprising:
    energy storage means for actuating said counter, said energy storage means being normally energized from a source of energy and being normally operatively disconnected from said counter;
    means for disconnecting said energy storage means from said energy source in response to the initiation of said service operation and for operatively connecting said energy storage means to said counter after a first predetermined time interval has elapsed from the initiation of said service operation, thereby actuating said counter; and
    means for preventing said energy storage means from receiving sufficient energy from said energy source for actuating said counter until a second predetermined time interval has elapsed from the completion of said service operation.

7. A device as in claim 6 where said energy storage means is a condenser.

8. A device as in claim 7 where said second and third mentioned means are time delay relays.

9. A device as in claim 8 further including:
    a mending device;
    a pulley movably coupled to said mending device;
    a spring loaded cam means in operative relationship with said time delay relays and with said pulley for depressing the contacts of said relays upon movement of said mending device; and
    means operatively associated with said cam means for enabling the mending operation to occur in the absence of spring pressure from said spring loaded cam means.

10. A device as in claim 9 wherein said enabling means includes a ratchet plate.

11. A method for counting the number of service operations performed by a machine operator with a textile or other type servicing device, while preventing fraudulent or inadvertent counts on the counter, comprising the steps of:
    removing a servicing device from its normal at rest position to perform a service operation;
    performing the service operation with the servicing device removed for at least a first predetermined time interval;
    actuating the counter after said first predetermined time interval only if the servicing device was initially in its normal rest position for a second predetermined time interval prior to its removal for the service operation; and
    replacing the servicing device in its normal at rest position;
    wherein said first and second predetermined time intervals act to prevent fraudulent or inadvertent counts on the counter by preventing the registration of a count on said counter by the rapid removal and replacement of said servicing device with respect to its normal position wherein said servicing device is not in its rest position for at least said second predetermined time interval and wherein said servicing device is not removed from its rest position for at least said first predetermined time interval.

12. The method of claim 11 including the step of automatically initiating said first predetermined time interval upon removal of said servicing device from its normal at rest position.

13. The method of claim 12 including the step of automatically initiating said second predetermined time interval upon replacement of said servicing device to its normal at rest position.

14. Apparatus for preventing fraudulent or inadvertent actuation of a counter by a textile machine operator, where said counter registers the number of service operations performed by said operator with a mending device, comprising:
    said mending device movable between a rest position and an operation area;
    energy storage means for actuating said counter, said energy storage means being normally operatively disconnected from said counter when said mending device is in its normal rest position;

means for operatively connecting said energy storage means to said counter only when said mending device is removed from its normal rest position and after a first predetermined time interval has elapsed from the initiation of said service operation, thereby actuating said counter; and means for preventing said energy storage means from actuating said counter until a second predetermined time interval has elapsed from the completion of a previous service operation and the replacement of said mending device in its normal rest position.

References Cited

UNITED STATES PATENTS 2,790,602   4/1957   Jeppson.
3,044,699   7/1962   Smith.

MAYNARD R. WILBUR, *Primary Examiner.*

GREGORY J. MAIER, *Assistant Examiner.*